(12) United States Patent
Nishikubo et al.

(10) Patent No.: US 12,124,264 B2
(45) Date of Patent: Oct. 22, 2024

(54) WORK VEHICLE

(71) Applicant: KUBOTA CORPORATION, Osaka (JP)

(72) Inventors: Takuya Nishikubo, Sakai (JP); Fumiya Yoshimura, Sakai (JP); Koichi Shintani, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 241 days.

(21) Appl. No.: 17/746,108

(22) Filed: May 17, 2022

(65) Prior Publication Data

US 2022/0276656 A1 Sep. 1, 2022

Related U.S. Application Data

(63) Continuation of application No. PCT/JP2020/046359, filed on Dec. 11, 2020.

(30) Foreign Application Priority Data

Dec. 18, 2019 (JP) .................................. 2019-228670

(51) Int. Cl.
*G05D 1/00* (2024.01)
*B62D 33/06* (2006.01)
(Continued)

(52) U.S. Cl.
CPC ....... *G05D 1/0214* (2013.01); *B62D 33/0617* (2013.01); *B62D 49/06* (2013.01); *G01S 15/931* (2013.01)

(58) Field of Classification Search
CPC .. G05D 1/0214; B62D 33/0617; B62D 49/06; G01S 15/931
(Continued)

(56) References Cited

U.S. PATENT DOCUMENTS 8,744,693 B2 * 6/2014 Hukkeri ................. G01S 17/89
701/448
8,751,103 B2 * 6/2014 Hukkeri ............... G01S 17/931
701/36
(Continued)

FOREIGN PATENT DOCUMENTS

CA 3010882 C * 11/2019 ........ B60W 30/0956
JP 2019-103421 A 6/2019
(Continued)

OTHER PUBLICATIONS

Official Communication issued in International Patent Application No. PCT/JP2020/046359, mailed on Mar. 2, 2021.
(Continued)

*Primary Examiner* — Atul Trivedi
(74) *Attorney, Agent, or Firm* — Keating & Bennett, LLP (57) ABSTRACT

A work vehicle includes a vehicle body including wheels, a controller to cause the vehicle body to perform automatic travel along a travel route set in advance, a driver seat mounted on the vehicle body, a driver seat protective body provided around the driver seat, first obstacle detectors provided at side portions of the driver seat protective body, and capable of detecting an obstacle; and second obstacle detectors provided at positions differing from positions of the first obstacle detectors in a front-back direction, and capable of detecting an obstacle. At a time of start of the automatic travel, the controller is configured or programmed to put each first obstacle detector in a detection state of detecting an obstacle, and, during automatic travel after the start of the automatic travel, the controller is configured or programmed to put each first obstacle detector in a non-detection state of not detecting the obstacle.

19 Claims, 7 Drawing Sheets

(51) Int. Cl.
*B62D 49/06* (2006.01)
*G01S 15/931* (2020.01)

(58) Field of Classification Search
USPC .......................................................... 701/301
See application file for complete search history.

(56) References Cited

U.S. PATENT DOCUMENTS

| | | | |
|---|---|---|---|
| 10,421,400 B2 * | 9/2019 | Imaizumi | H04N 7/18 |
| 10,479,354 B2 * | 11/2019 | Posselius | B60W 30/09 |
| 2017/0160748 A1 * | 6/2017 | Nakagawaa | A01B 69/008 |
| 2017/0259753 A1 | 9/2017 | Meyhofer et al. | |
| 2018/0222390 A1 * | 8/2018 | Imaizumi | H04N 7/181 |
| 2018/0279549 A1 * | 10/2018 | Lacy | A01D 41/145 |
| 2018/0319392 A1 * | 11/2018 | Posselius | G01S 13/931 |
| 2018/0319396 A1 * | 11/2018 | Foster | B60W 30/0956 |
| 2019/0163190 A1 * | 5/2019 | Ono | A01B 69/008 |
| 2019/0302783 A1 * | 10/2019 | Morwood | G05D 1/0274 |
| 2023/0324913 A1 * | 10/2023 | Hattori | G01S 17/89 701/23 |

FOREIGN PATENT DOCUMENTS

| | | | | |
|---|---|---|---|---|
| JP | 2019-175048 A | | 10/2019 | |
| JP | 2019-175059 A | | 10/2019 | |
| WO | WO-2012169352 A1 | * | 12/2012 | ............. B60K 35/00 |
| WO | WO-2015118731 A1 | * | 8/2015 | ........... A01B 69/008 |
| WO | WO-2015178446 A1 | * | 11/2015 | ............. A01B 69/00 |
| WO | WO-2018135201 A1 | * | 7/2018 | ............. A01B 69/00 |
| WO | WO-2018135234 A1 | * | 7/2018 | ........... A01B 69/008 |
| WO | WO-2018135256 A1 | * | 7/2018 | ............. A01B 69/00 |
| WO | WO-2019054277 A1 | * | 3/2019 | ........... G01S 15/101 |
| WO | WO-2019187883 A1 | * | 10/2019 | ............. A01B 69/00 |
| WO | WO-2019187884 A1 | * | 10/2019 | ............. A01B 69/00 |
| WO | WO-2019187937 A1 | * | 10/2019 | ............. A01B 69/00 |
| WO | WO-2019187938 A1 | * | 10/2019 | ............. A01B 69/00 |
| WO | WO-2020166164 A1 | * | 8/2020 | ........... A01B 69/001 |
| WO | WO-2020240983 A1 | * | 12/2020 | ........... A01B 69/008 |
| WO | WO-2021075315 A1 | * | 4/2021 | ........... A01B 69/008 |

OTHER PUBLICATIONS

Official Communication issued in corresponding European Patent Application No. 20901628.6, mailed on Nov. 2, 2023.

* cited by examiner

WORK VEHICLE

CROSS REFERENCE TO RELATED APPLICATIONS

This application is a continuation application of International Application No. PCT/JP2020/046359, filed on Dec. 11, 2020, which claims the benefit of priority to Japanese Patent Application No. 2019-228670, filed on Dec. 18, 2019. The entire contents of each of these applications are hereby incorporated herein by reference.

BACKGROUND OF THE INVENTION

1. Field of the Invention

The present invention relates to a work vehicle, such as a tractor.

2. Description of the Related Art

Conventionally, a work vehicle disclosed in Japanese Unexamined Patent Application Publication No. 2019-175059 is known.

The work vehicle (tractor) disclosed in Japanese Unexamined Patent Application Publication No. 2019-175059 can perform automatic travel, includes an obstacle detector that can detect an obstacle existing around a travel body, and can perform collision prevention control when an obstacle has been detected. The obstacle detector includes a laser sensor that detects obstacles existing in front of and behind the travel body, and a sonar that detects an obstacle existing beside a cabin.

SUMMARY OF THE INVENTION

However, in the disclosed technology of Japanese Unexamined Patent Application Publication No. 2019-175059, as shown in FIG. 12 of Japanese Unexamined Patent Application Publication No. 2019-175059, in a state before the work vehicle starts automatic travel, a non-detection range (for example, a region beside a front wheel) that is not included in a detection range of the laser sensor and in a detection range of the sonar exists. Therefore, when the sonar is turned off after the start of the automatic travel, if an obstacle exists in the non-detection range, the work vehicle may come into contact with the obstacle. In order to overcome such a problem, keeping on the sonar at all times after the start of the automatic travel may be considered. However, in such a case, it may no longer be possible to realize smooth automatic travel due to, for example, the sonar falsely detecting a crop or the like as an obstacle.

In view of such circumstances, preferred embodiments of the present invention provide work vehicles that each prevent contact with an obstacle when the work vehicle starts to move due to automatic travel, and that is capable of realizing smooth automatic travel.

A work vehicle according to an aspect of a preferred embodiment of the present invention includes a vehicle body including a wheel, a controller to cause the vehicle body to perform automatic travel along a travel route set in advance, a driver seat mounted on the vehicle body, a driver seat protective body provided around the driver seat, a first obstacle detector provided at a side portion of the driver seat protective body, and capable of detecting an obstacle, and a second obstacle detector provided at a position differing from a position of the first obstacle detector in a front-back direction, and capable of detecting the obstacle. At a time of start of the automatic travel, the controller is configured or programmed to put the first obstacle detector in a detection state of detecting the obstacle, and, during automatic travel after the start of the automatic travel, the controller is configured or programmed to put the first obstacle detector in a non-detection state of not detecting the obstacle.

Preferably, after the start of the automatic travel, the controller is configured or programmed to put the first obstacle detector in the detection state of detecting the obstacle until the first obstacle detector passes a position of the wheel or a lateral position of the wheel before the start of the automatic travel, and the controller is configured or programmed to put the first obstacle detector in the non-detection state of not detecting the obstacle after the first obstacle detector has passed the position of the wheel or the lateral position of the wheel before the start of the automatic travel.

Preferably, the wheel includes a front wheel provided at a front portion of the vehicle body and a rear wheel provided at a rear portion of the vehicle body, the second obstacle detector is provided forward of the first obstacle detector, and, after the start of the automatic travel, the controller is configured or programmed to put the first obstacle detector in the detection state of detecting the obstacle until the first obstacle detector passes a position of the front wheel or a lateral position of the front wheel before the start of the automatic travel, and the controller is configured or programmed to put the first obstacle detector in the non-detection state of not detecting the obstacle after the first obstacle detector has passed the position of the front wheel or the lateral position of the front wheel before the start of the automatic travel.

Preferably, based on at least an elapsed time from the start of the automatic travel, the controller is configured or programmed to determine that the first obstacle detector has passed the position of the wheel or the lateral position of the wheel before the start of the automatic travel.

Preferably, based on an elapsed time from the start of the automatic travel and a travel speed of the vehicle body, the controller is configured or programmed to determine that the first obstacle detector has passed the position of the wheel or the lateral position of the wheel before the start of the automatic travel.

Preferably, based on an elapsed time from the start of the automatic travel and an acceleration of the vehicle body, the controller is configured or programmed to determine that the first obstacle detector has passed the position of the wheel or the lateral position of the wheel before the start of the automatic travel.

Preferably, the work vehicle includes a position detector to detect a position of the vehicle body, and, based on the position of the vehicle body detected by the position detector, the controller is configured or programmed to determine that the first obstacle detector has passed the position of the wheel or the lateral position of the wheel before the start of the automatic travel.

Preferably, the second obstacle detector is forward of the front wheel, and the first obstacle detector is between the front wheel and the rear wheel so as to be capable of detecting an obstacle outward of the front wheel in a vehicle-width direction.

Preferably, the second obstacle detector is outward of the front wheel in a vehicle-width direction, and the first obstacle detector is inward of the second obstacle detector in the vehicle-width direction.

Preferably, the driver seat protective body includes a cabin mounted on the vehicle body, and the first obstacle detector is capable of detecting an obstacle between a doorway of the cabin and the front wheel.

Preferably, the first obstacle detector includes a sonar to detect an obstacle by irradiation with a sound wave as a detection wave, and the second obstacle detector includes a laser scanner that detects an obstacle by irradiation with a laser as a detection wave.

Preferably, a time from the time of the start of the automatic travel to a time at which the first obstacle detector is put in the non-detection state during the automatic travel after the start of the automatic travel is set to a time in which an entire region of a non-detection range not included in a detection range of the first obstacle detector and not included in a detection range of the second obstacle detector before the start of the automatic travel is covered by the detection range of the first obstacle detector due to a movement after the start of the automatic travel.

Preferably, the vehicle body includes a vehicle-body frame, a hood is provided above the vehicle-body frame, and the first obstacle detector is outward of the hood in a vehicle-width direction and between the front wheel and the rear wheel.

Preferably, the vehicle body includes a vehicle-body frame, a hood is provided above the vehicle-body frame, and the first obstacle detector is below an upper end portion of the hood and above a lower end portion of the cabin.

Preferably, the front wheel includes a left front wheel and a right front wheel, and the second obstacle detector is on each of a front left side of the left front wheel and a front right side of the right front wheel.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention is described below with reference to the drawings.

Figure 1:
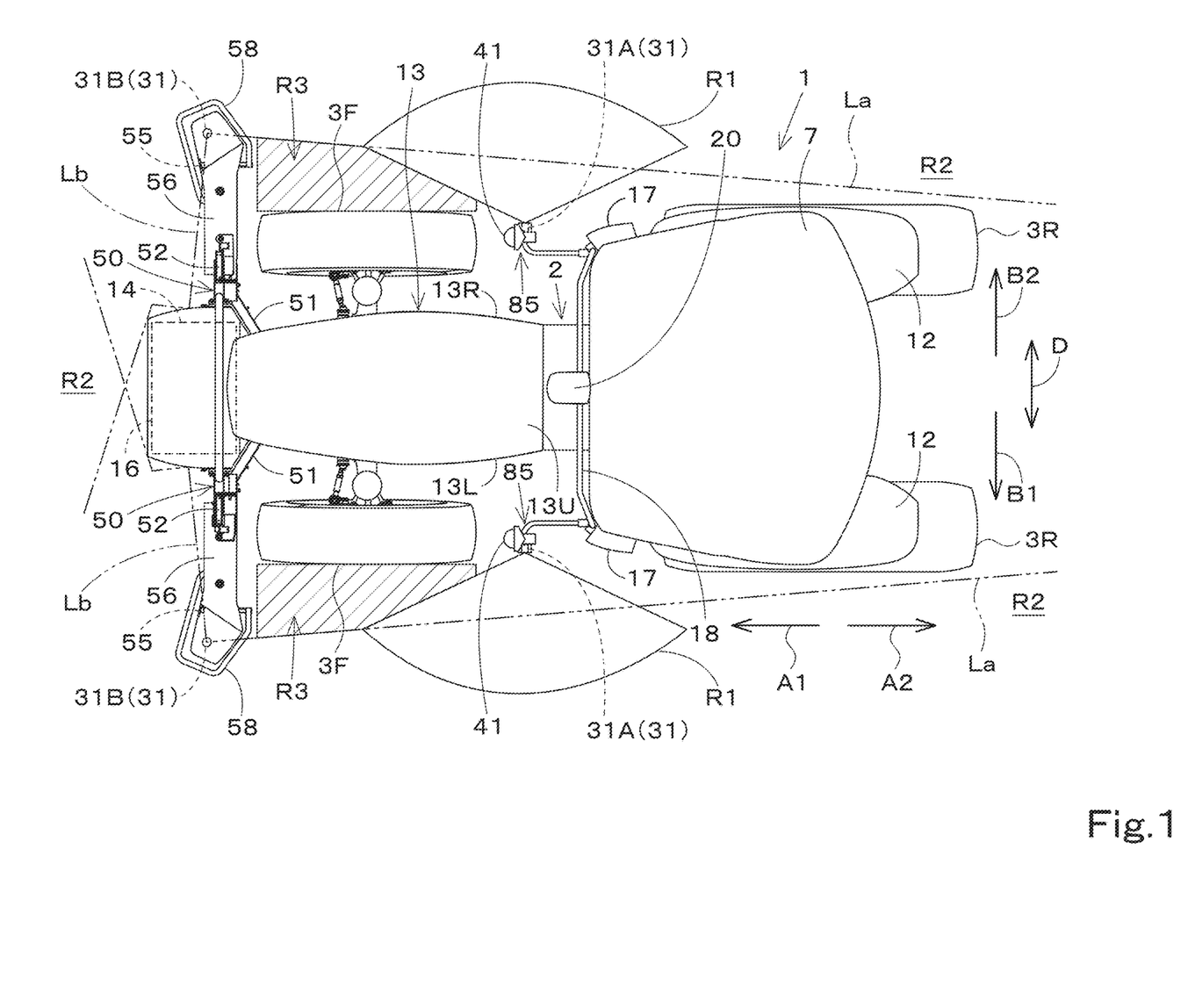
FIG. 1 is a plan view of a work vehicle.
Figure 2:
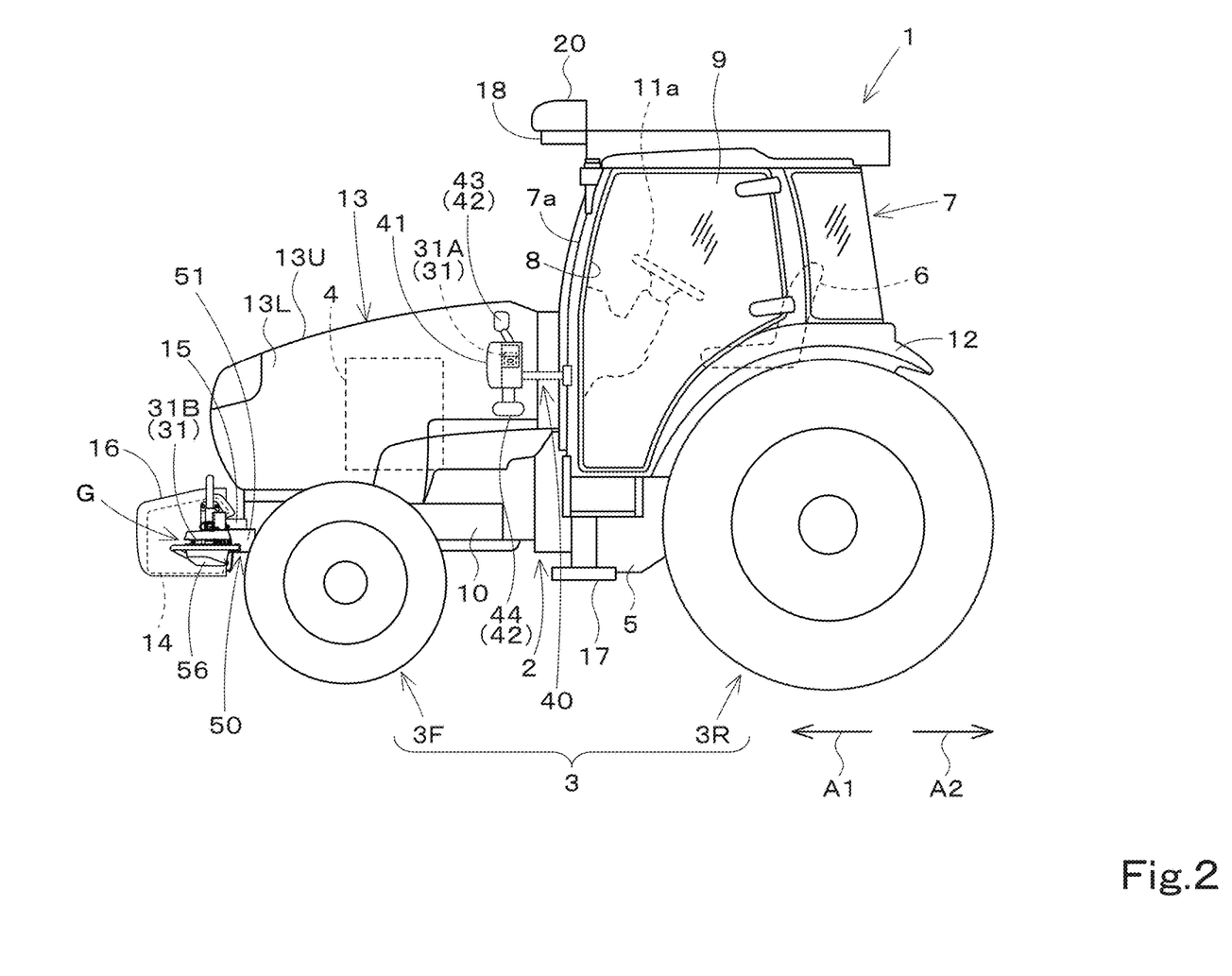
FIG. 2 is a side view of the work vehicle.

FIGS. 1 and 2 each illustrate a preferred embodiment of a work vehicle 1 according to the present invention. In the present preferred embodiment, the work vehicle 1 is described as being a tractor 1. However, the work vehicle 1 is not limited to a tractor and may be another type of work vehicle (agricultural vehicle), such as a combine or a rice-planting machine.

In the description below, a forward direction corresponds to a forward direction (in the direction of arrow A1) of an operator seated on a driver seat 6 of the tractor 1, a rearward direction corresponds to a rearward direction (in the direction of arrow A2) of the operator, a leftward direction corresponds to a leftward direction (in the direction of arrow B1) of the operator, and a rightward direction corresponds to a rightward direction (in the direction of arrow B2) of the operator. The directions of a double-headed arrow D are vehicle-width directions. A direction that is a vehicle-width direction and that is away from the center in the vehicle-width direction is a vehicle-width-direction outward direction, and a direction that is a vehicle-width direction and that is toward the center in the vehicle-width direction is a vehicle-width-direction inward direction.

As illustrated in FIGS. 1 and 2, the tractor 1 includes a vehicle body 2, a travel device 3, a prime mover 4, and a transmission 5. The travel device 3 supports the vehicle body 2 so that the vehicle body 2 can travel, and has front wheels 3F and rear wheels 3R. Although, in the present preferred embodiment, the front wheels 3F and the rear wheels 3R are of a tire type, the front wheels 3F and the rear wheels 3R may be of a crawler type.

The prime mover 4 is, for example, an engine (diesel engine or gasoline engine) or an electric motor. The transmission 5 can switch a thrust force of the travel device 3 by changing the speed and can switch the travel device 3 between forward travel and backward travel.

The driver seat 6 is mounted on the vehicle body 2. A driver seat protective body 7 is provided around the driver seat 6. Although, in the present preferred embodiment, the driver seat protective body 7 includes a cabin that protects the driver seat 6 by surrounding a forward side, a rearward side, an upper side, and lateral sides of the driver seat 6, the driver seat protective body 7 may be, for example, a ROPS. In the description below, the driver seat protective body 7 is described as a cabin 7. Side surfaces (a left side surface and a right side surface) of the cabin 7 each include a doorway 8 through which an operator gets into and out of the cabin 7 and an entry/exit door 9 for opening and closing the doorway 8. Entry/exit steps 17 on which an operator places his foot when the operator gets into and out of the cabin 7 are disposed below the cabin 7. Each entry/exit step 17 is provided below a corresponding one of the left and right entry/exit doors 9. Fenders 12 are mounted below the cabin 7. Each fender 12 covers an upper portion of the corresponding the rear wheel 3R.

A rear portion of the vehicle body 2 is provided with a coupling portion (not illustrated) including, for example, a 3-point link mechanism. A work device (such as an implement) can be coupled to the coupling portion so as to be attachable and detachable to and from the coupling portion. By coupling the work device to the coupling portion, it is possible to pull the work device by the vehicle body 2. Examples of the work device include a cultivating device for cultivating, a fertilizer spraying device for spraying a fertilizer, an agrochemical spraying device for spraying an agrochemical, a harvesting device for harvesting, a cutting device for cutting grass or the like, a spreading device for spreading grass or the like, a grass collecting device for collecting grass or the like, and a shaping device for shaping grass or the like.

The vehicle body 2 includes a vehicle-body frame 10. The vehicle-body frame 10 extends forward from the transmission 5 side, and supports a lower portion of the prime mover 4. As illustrated in FIG. 2, a hood 13 is provided above the vehicle-body frame 10. The hood 13 extends in a front-back direction along the vehicle-body frame 10. The hood 13 is disposed forward of a central portion of the cabin 7 in the vehicle-width direction. The hood 13 includes a left side wall 13L provided on the left side, a right side wall 13R provided on the right side, and an upper wall portion 13U that couples an upper portion of the left side wall 13L and an upper portion of the right side wall 13R to each other. An engine compartment is defined by the left side wall 13L, the right side wall 13R, and the upper wall portion 13U, and accommodates, for example, the prime mover 4, a cooling fan, a radiator, and a battery. Each front wheel 3F is disposed, one on a left lateral side of the left side wall 13L and the other on a right lateral side of the right side wall 13R.

A weight 14 is provided on a front side of the hood 13, that is, on a front side of the vehicle-body frame 10. The weight 14 is attached to a weight bracket 15 provided on a front portion of the vehicle body 2. The weight bracket 15 is attached to a front portion of the vehicle-body frame 10 by a fastener, such as a bolt. A weight cover 16 covers the weight 14.

Figure 3:
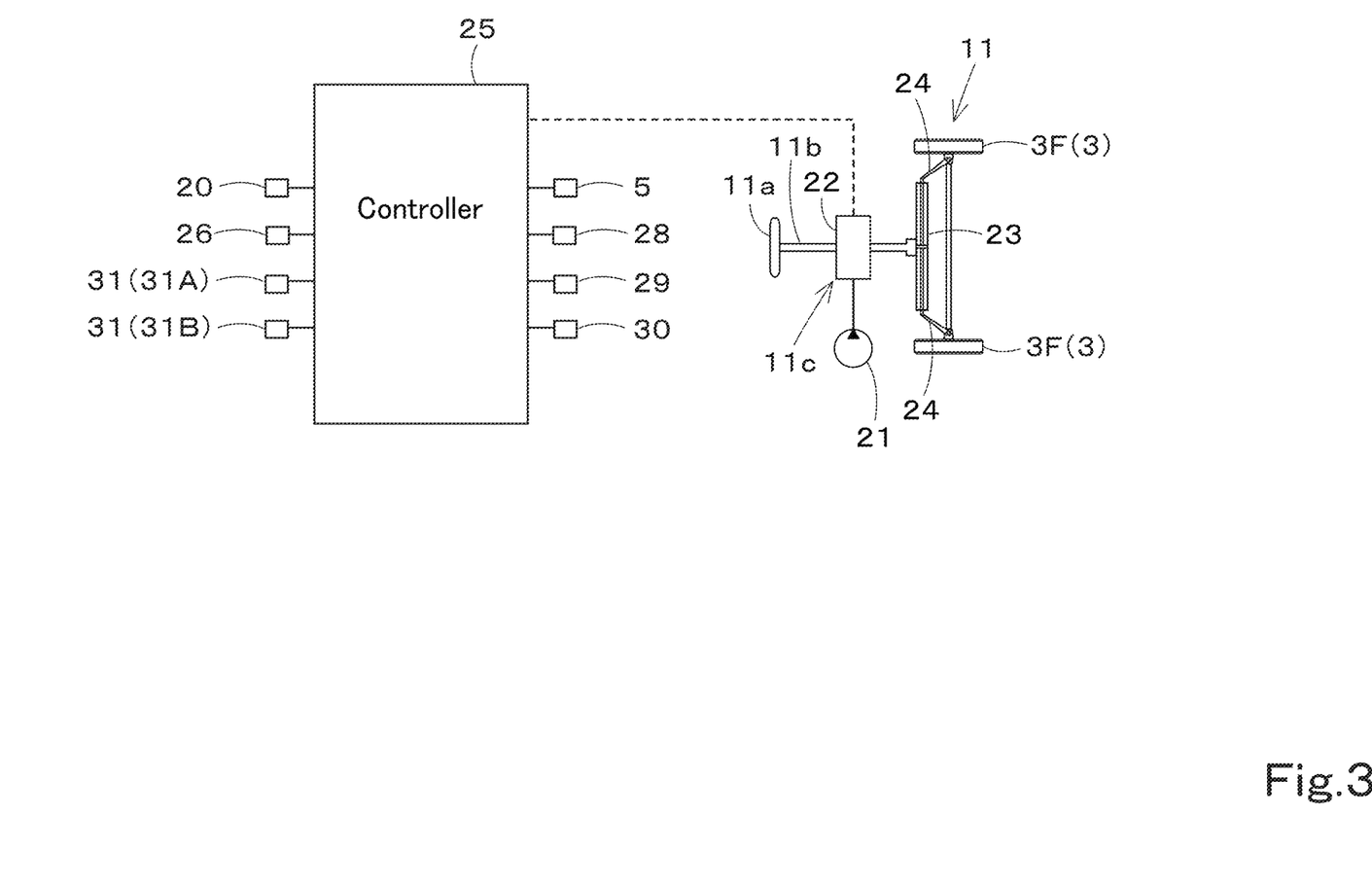
FIG. 3 is a block diagram of a control system of the work vehicle.

As illustrated in FIG. 3, the tractor 1 includes a steering device 11. The steering device 11 includes a steering wheel 11a, a rotation shaft (steering shaft) 11b that rotates as the steering wheel 11a is rotated, and an auxiliary mechanism (power steering mechanism) 11c that assists in the steering of the steering wheel 11a. The auxiliary mechanism 11c includes a hydraulic pump 21, a control valve 22 to which hydraulic fluid discharged from the hydraulic pump 21 is supplied, and a steering cylinder 23 that is operated by the control valve 22. The control valve 22 is an electromagnetic valve that operates based on a control signal. The control valve 22 is, for example, a 3-position switching valve that is switchable by the movement of a spool or the like. The control valve 22 is also switchable by steering the steering shaft 11b. The steering cylinder 23 is connected to arms (knuckle arms) 24 that change the orientations of the front wheels 3F.

Therefore, when the steering wheel 11a is operated, a switching position and an opening degree of the control valve 22 is switched in accordance with the steering wheel 11a, and the steering cylinder 23 extends or contracts leftward or rightward in accordance with the switching position and the opening degree of the control valve 22 to thereby make it possible to change a steering direction of each front wheel 3F. Note that the above-described steering device 11 is one example, and the structure of the steering device 11 is not limited to the above-described structure.

As illustrated in FIGS. 1 and 2, the tractor 1 includes a position detector 20. The position detector 20 is mounted forward of a top board of the cabin 7 via a mount body 18. However, the mounting position of the position detector 20 is not limited to the illustrated position, and the position detector 20 may be mounted on the top board of the cabin 7 or may be mounted at a different location on the vehicle body 2. The position detector 20 may be attached to the above-described work device, such as a cultivating device.

The position detector 20 is a device that detects a self position (position determination information including latitude and longitude) by a navigation satellite system. That is, the position detector 20 receives a signal (for example, the position of a positioning satellite, transmission time, or correction information) transmitted from the positioning satellite, and detects the position (the latitude and the longitude) based on the received signal. The position detector 20 may detect, as the self position (the latitude and the longitude), a position corrected based on a signal of correction or the like from a base station (reference station) that is capable of receiving the signal from the positioning satellite. Alternatively, the position detector 20 may have an inertial measurement device, such as a gyroscope sensor or an acceleration sensor, and detect, as the self position, a position corrected by the inertial measurement device. The position detector 20 is capable of detecting the position (travel position) of the vehicle body 2 of the tractor 1. The self position of the tractor 1 that is detected by the position detector 20 may be, for example, the central position of the vehicle body 2, the position of at least one front wheel 3F (for example, the position of its front end), or the position of at least one rear wheel 3R (for example, the position of its rear end), or may be the position of at least one obstacle detector 31 described below.

As illustrated in FIG. 3, the tractor 1 includes a controller 25. The controller 25 includes, for example, electric circuits or electronic circuits, including a CPU, a storage unit (RAM, ROM, or the like), and the like, and performs various controls of the tractor 1 based on, for example, a program stored in the storage unit. A state detector 26 that detects, for example, a drive state of the tractor 1 is connected to the controller 25. The state detector 26 is, for example, a device that detects the state of a travel system, and detects the state of, for example, a crank sensor, a cam sensor, an engine rotation sensor, an axle sensor, a vehicle speed sensor, an acceleration sensor, a steering angle sensor, or the position detector 20. Note that the state detector 26 may be a device that detects states other than the state of the travel system, and may be, for example, a lifting lever detection sensor or a PTO rotation detection sensor. Alternatively, the tractor 1 may include a time measuring device that measures time and is capable of transmitting the measured time to the controller 25.

The controller 25 controls the travel system and a work system of the tractor 1. For example, based on a detection state detected by the state detector 26, the controller 25 controls the engine speed, the vehicle speed, a steering angle of the steering device 11, or the like. Based on a detection state detected by the state detector 26, the controller 25 controls, for example, the raising and the lowering of a lifting device that raises and lowers the connection portion or a PTO rotation speed.

The controller 25 can perform control of automatic travel (automatic travel control) of the tractor 1 (the vehicle body 2). The controller 25 can perform switching between an automatic travel mode and a manual travel mode. In the automatic travel mode, the controller 25 causes the vehicle body 2 to perform automatic travel along a travel route set in advance. The controller 25 sets a switching position and an opening degree of the control valve 22 so as to cause at least a travel position of the vehicle body 2 (position detected by the position detector 20) and the travel route (travel path) set in advance to coincide with each other, that is, the vehicle body 2 and the travel route coincide with each other. In other words, in the automatic travel mode, the controller 25 sets a movement direction and a movement amount of the steering cylinder 23 (steering direction and steering angle of each front wheel 3F) so as to cause a travel position of the tractor 1 and the travel route to coincide with each other.

Specifically, in the automatic travel mode, the controller 25 compares the travel position of the vehicle body 2 and a position indicated by the travel route (planned travel position), and, when the travel position and the planned travel position coincide with each other, a steering angle and a steering direction of the steering wheel 11a of the steering device 11 (the steering angle and the steering direction of each front wheel 3F) are maintained without being changed (the opening degree and the switching position of the control valve 22 are maintained without being changed). When the travel position and the planned travel position do not coincide with each other, the controller 25 changes the steering angle and/or the steering direction of the steering wheel 11a of the steering device 11 (the opening degree and/or the switching position of the control valve 22) so as to cause a deviation (difference) between the travel position and the planned travel position to be zero.

Note that, in the above-described preferred embodiment, although, in the automatic travel control, the controller 25 changes the steering angle of the steering device 11 based on the deviation between the travel position and the planned travel position, when an orientation of the travel route and an orientation (vehicle body orientation) in a movement direction (travel direction) of the tractor 1 (the vehicle body 2) differ from each other, the controller 25 may set the steering angle so as to cause the vehicle body orientation to be the same as the orientation of the travel route. Alternatively, in the automatic travel control, the controller 25 may set a final steering angle in the automatic travel control based on a steering angle obtained based on a deviation (positional deviation) and a steering angle obtained based on an orientation deviation. Alternatively, the steering angle may be set by a method differing from the method of setting the steering angle in the above-described automatic travel control.

Alternatively, in the automatic travel control, the controller 25 may control the rotation speed of the travel device 3 (that is, the front wheels 3F and/or the rear wheels 3R) so as to cause the actual vehicle speed of the tractor 1 (the vehicle body 2) to be the same as a vehicle speed corresponding to the travel route set in advance.

The transmission 5, a forward-reverse switching device 28, a PTO clutch 29, and a braking device 30 are connected to the controller 25. The controller 25 is connected to the transmission 5, the forward-reverse switching device 28, the PTO clutch 29, and the braking device 30 via an in-vehicle LAN, such as CAN (Controller Area Network), or a communication line. Therefore, the controller 25 is capable of controlling the operations of the transmission 5, the forward-reverse switching device 28, the PTO clutch 29, and the braking device 30.

As illustrated in FIGS. 1 to 3, the tractor 1 includes the at least one obstacle detector 31 that detects an obstacle, which hinders travelling. The at least one obstacle detector 31 includes at least one first obstacle detector 31A and at least one second obstacle detector 31B. The at least one first obstacle detector 31A is a sonar that detects an obstacle by irradiation with a sound wave (ultrasonic wave) as a detection wave. The at least one second obstacle detector 31B is a laser scanner that detects an obstacle by irradiation with a light wave as a detection wave. However, the obstacle detectors may be sensors (distance measuring sensors) other than sonars and laser scanners.

The controller 25 controls automatic travel based on results of detections of obstacles by the obstacle detectors 31. For example, when the obstacle detectors 31 are not detecting an obstacle, the automatic travel is continued; and, when any one of the obstacle detectors 31 has detected an obstacle, the automatic travel is stopped. More specifically, when any one of the obstacle detectors 31 has detected an obstacle, if the distance between the obstacle and the tractor 1 is less than or equal to a predetermined distance, the controller 25 stops the automatic travel by stopping the travel of the tractor 1.

Specifically, when any one of the obstacle detectors 31 has detected an obstacle, the controller 25 controls the operations of the transmission 5, the forward-reverse switching device 28, the PTO clutch 29, and the braking device 30. Specifically, the controller 25 reduces the vehicle speed by shift-down operating of the transmission 5. The controller 25 switches the forward-reverse switching device 28 to a neutral state, and causes the braking device 30 to operate. Therefore, the automatic travel of the tractor 1 is stopped. Further, the controller 25 switches the PTO clutch 29 to an off state, and blocks transmission of power to a work device from a PTO shaft of the tractor 1. Thus, driving of the work device is stopped.

As illustrated in FIG. 1, the at least one first obstacle detector 31A is provided at a side portion of the cabin 7. Specifically, the at least one first obstacle detector 31A includes one at a left side portion of the cabin 7 and the other at a right side portion of the cabin 7. The first obstacle detector 31A provided at the left side portion of the cabin 7 is positioned at the front left side of the cabin 7. The first obstacle detector 31A provided at the right side portion of the cabin 7 is positioned at the front right side of the cabin 7. The first obstacle detector 31A that is positioned on the front left side of the cabin 7 and the first obstacle detector 31A that is positioned on the front right side of the cabin 7 are symmetrically positioned on two sides of a central line of the tractor 1 in the vehicle-width direction.

The first obstacle detectors 31A are disposed outward of the vehicle body 2 in the vehicle-width direction and between the front wheels 3F and the rear wheels 3R. More specifically, the first obstacle detectors 31A are disposed outward of the hood 13 in the vehicle-width direction and between the front wheels 3F and the rear wheels 3R. In the present preferred embodiment, the first obstacle detector 31A that is positioned on the front left side of the cabin 7 is disposed forward of the left entry/exit step 17 and rearward of the left front wheel 3F in the front-back direction. The first obstacle detector 31A that is positioned on the front right side of the cabin 7 is disposed forward of the right entry/exit step 17 and rearward of the right front wheel 3F in the front-back direction. As illustrated in FIG. 2, each first obstacle detector 31A is disposed below an upper end portion of the hood 13 and above a lower end portion of the cabin 7.

As illustrated in FIG. 1, in the vehicle-width direction, each first obstacle detector 31A is positioned between an end portion on an outer side in the vehicle-width direction (outer end portion) and an end portion on an inner side in the vehicle-width direction (inner end portion) of a corresponding one of the front wheels 3F and between an end portion on an outer side in the vehicle-width direction (outer end portion) and an end portion on an inner side in the vehicle-width direction (inner end portion) of a corresponding one of the rear wheels 3R. Each first obstacle detector 31A can detect an obstacle existing outward of the corresponding front wheel 3F in the vehicle-width direction. Each first obstacle detector 31A can detect at least an obstacle existing between the corresponding doorway 8 of the cabin 7 and the corresponding front wheel 3F.

Figure 4:
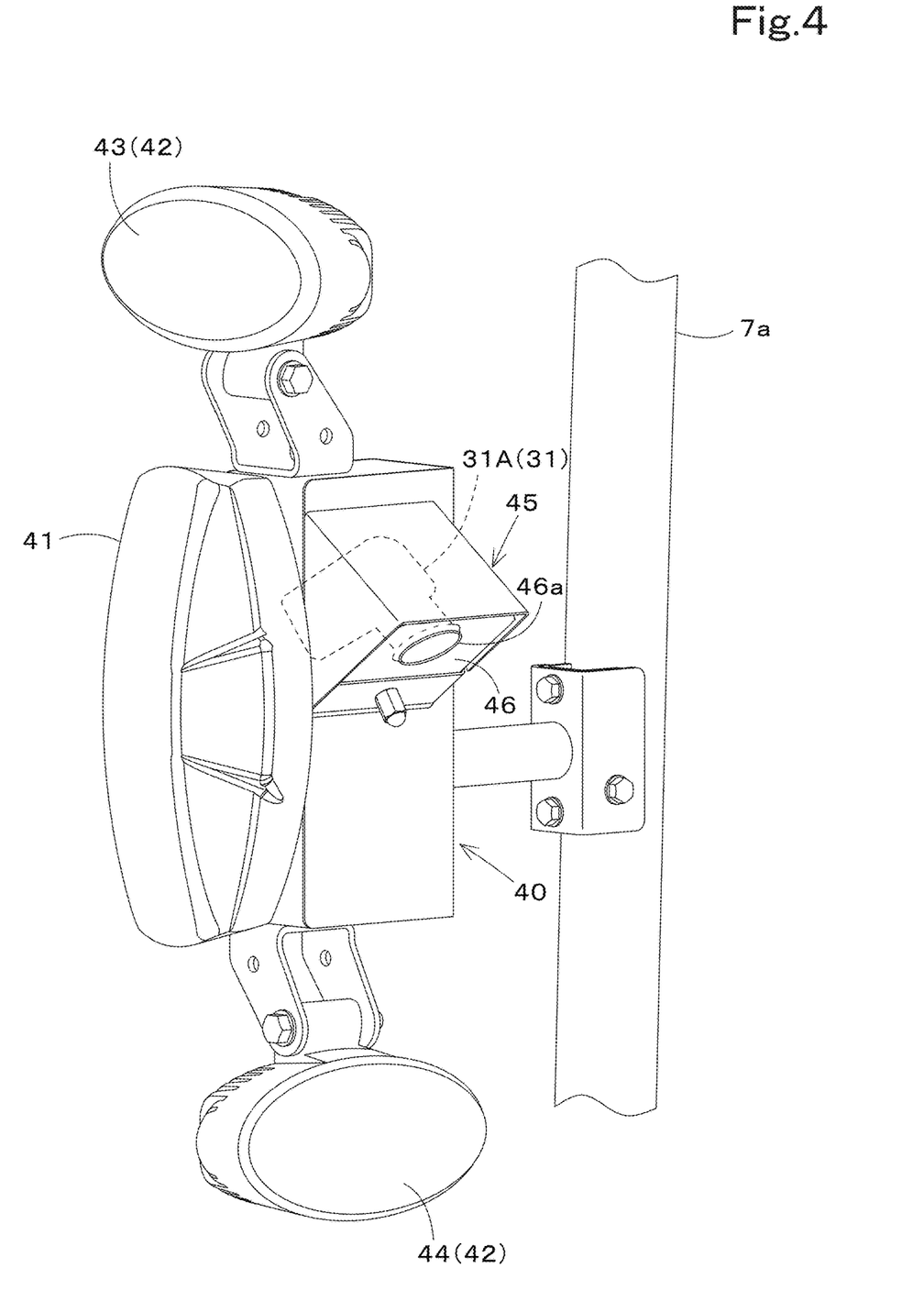
FIG. 4 is a perspective view illustrating a first obstacle detector.

As illustrated in FIGS. 2 and 4, each first obstacle detector 31A is mounted on the cabin 7 via a corresponding mounting bracket 40. Combination lamps 41 and work lamps 42 are also each mounted on the cabin 7 via a corresponding one of the mounting brackets 40. A plurality of lamps of the combination lamps 41 are, for example, position lamps, blinker lamps, or hazard lamps. The work lamps 42 include a front lamp 43 and a side illumination lamp 44. Each mounting bracket 40 is mounted on a corresponding one of front pillars 7a of the cabin 7.

Each mounting bracket 40 is provided with a detector mounting portion 45. Each detector mounting portion 45 has an inclined plate 46 that extends upward toward an outer side in the vehicle-width direction. Each inclined plate 46 has an opening 46a for transmission at which a transmission portion of the corresponding first obstacle detector 31A is disposed. A sound wave that is transmitted from each first obstacle detector 31A passes through the corresponding opening 46a for transmission and moves outward in the vehicle-width direction and downward. Therefore, the first obstacle detectors 31A are capable of detecting obstacles existing beside and below (lower right and lower left of) the vehicle body 2.

As illustrated in FIGS. 1 and 2, the at least one second obstacle detector 31B is provided at a position differing from the positions of the first obstacle detectors 31A in the front-back direction. In the present preferred embodiment, the at least one second obstacle detector 31B is provided forward of the first obstacle detectors 31A. The at least one second obstacle detector 31B is disposed forward of the corresponding front wheel 3F. The at least one second obstacle detector 31B is disposed outward of the corresponding front wheel 3F in the vehicle-width direction. The at least one second obstacle detector 31B is disposed outward of the corresponding rear wheel 3R in the vehicle-width direction. The at least one second obstacle detector 31B is disposed outward of the corresponding first obstacle detector 31A in the vehicle-width direction.

As illustrated in FIG. 1, the at least one second obstacle detector 31B includes one on the front left side of the left front wheel 3F and the other on the front right side of the right front wheel 3F. The second obstacle detector 31B disposed at the front left side of the left front wheel 3F and the second obstacle detector 31B disposed on the front right side of the right front wheel 3F are symmetrically positioned on two sides of the central line of the tractor 1 in the vehicle-width direction.

Note that second obstacle detectors 31B may be provided rearward of the first obstacle detectors 31A. In this case, the second obstacle detectors 31B are provided both forward of and rearward of the first obstacle detectors 31A. When the second obstacle detectors 31B are provided rearward of the first obstacle detectors 31A, for example, it is possible to dispose the second obstacle detectors 31B at rear portions of the cabin 7 or the like, and rearward of the rear wheels 3R.

Figure 5:
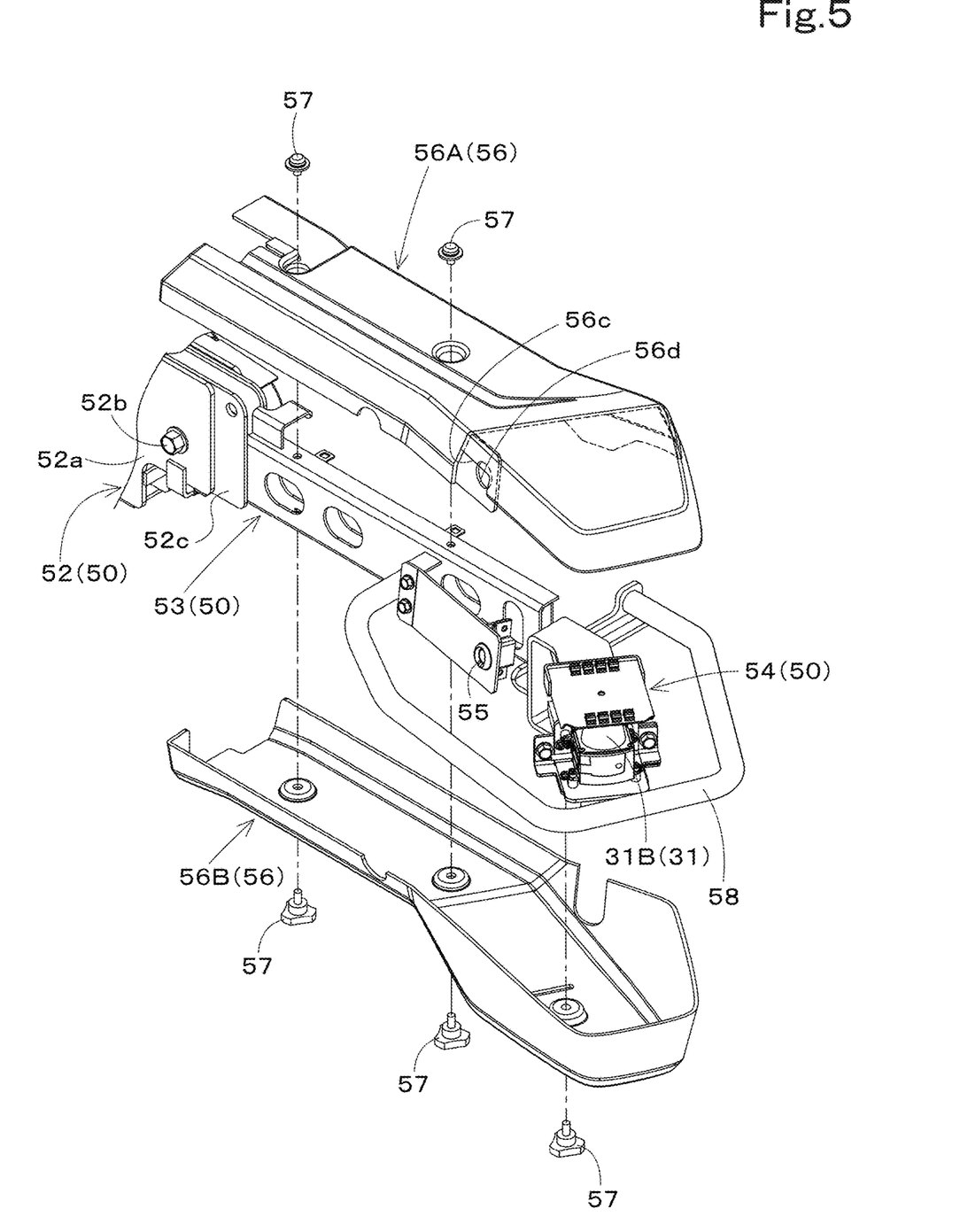
FIG. 5 is an exploded perspective front view illustrating a second obstacle detector.

As illustrated in FIGS. 1 and 2, each second obstacle detector 31B is mounted on the vehicle-body frame 10 via a corresponding mounting structural body 50. As illustrated in FIGS. 1 and 5, each mounting structural body 50 has a first structural body 51, a second structural body 52, a third structural body 53, and a fourth structural body 54. The first structural bodies 51 are mounted on the vehicle-body frame 10, and extend forward and outward in the vehicle-width direction (toward the front left and the front right) from the vehicle-body frame 10. Each second structural body 52 is mounted on a front end (extension end) of the corresponding first structural body 51. Each second structural body 52 includes a base portion 52a mounted on the corresponding first structural body 51, a rotation shaft 52b provided at the base portion 52a and extending in the front-back direction, and a rotation portion 52c rotatable around the rotation shaft 52b as a fulcrum. Each third structural body 53 is mounted on the corresponding rotation portion 52c and extends outward in the vehicle-width direction from the corresponding rotation portion 52c. Each fourth structural body 54 is mounted on an outer end portion in the vehicle-width direction of the corresponding third structural body 53, and supports the corresponding second obstacle detector 31B. Sonars 55 that differ from the sonars of the first obstacle detectors 31A are mounted on the third structural bodies 53.

By rotating the third structural body 53 of each mounting structural body 50 upward around the rotation shaft 52b as a fulcrum, the position of each second obstacle detector 31B can be changed to a detection position (see FIGS. 1 and 2) for detecting an obstacle, and to a retraction position (not illustrated) at which the third structural body 53 retracts toward the vehicle body 2 side from the detection position. Each mounting structural body 50 is provided with a handle 58 that can be grasped when changing the position of the corresponding second obstacle detector 31B. When each second obstacle detector 31B is at the detection position, an emission direction of laser that is emitted from each second obstacle detector 31B is a horizontal direction.

Each second obstacle detector 31B is covered by a corresponding cover 56. Each cover 56 is mounted on the corresponding third structural body 53 by fasteners 57, such as bolts. Each cover 56 includes an upper cover 56A disposed above the corresponding second obstacle detector 31B and a lower cover 56B disposed below the corresponding second obstacle detector 31B. A gap G (see FIG. 2) is formed between the upper cover 56A and the lower cover 56B around each second obstacle detector 31B, and each second obstacle detector 31B is capable of transmitting and receiving a detection wave (laser) via the corresponding gap G. Each sonar 55 is capable of transmitting and receiving a detection wave (sound wave) via openings (cutout 56c and hole 56d) formed in the corresponding upper cover 56A.

In FIG. 1, a detection range of each first obstacle detector 31A is denoted by symbol R1, and a detection range of each second obstacle detector 31B is denoted by symbol R2. The detection range R1 of each first obstacle detector 31A is a region having a fan shape in plan view and facing outward of the vehicle body from the corresponding first obstacle detector 31A. The detection range R2 of each second obstacle detector 31B is a region situated outward of the vehicle body from a line La and forward of a line Lb. As illustrated in FIG. 1, when the tractor 1 is stopped (before the start of automatic travel), non-detection ranges R3 that are not included in the detection ranges R1 of the first obstacle detectors 31A and the detection ranges R2 of the second obstacle detectors 31B exist beside the respective front wheels 3F (outward of the vehicle body). The non-detection ranges R3 exist for ensuring movable spaces of the front wheels 3F at the time of a steering operation.

The controller 25 performs control described below for detecting obstacles existing in the non-detection ranges R3.

At a time of start of automatic travel, the controller 25 puts each first obstacle detector 31A in a detection state of detecting an obstacle, and, during automatic travel after the start of the automatic travel, the controller 25 puts each first obstacle detector 31A in a non-detection state of not detecting an obstacle.

In other words, within a predetermined time from the time of the start after the automatic travel, the controller 25 puts each first obstacle detector 31A in the detection state of detecting an obstacle, and, after the elapse of the predetermined time, the controller 25 puts each first obstacle detector 31A in the non-detection state of not detecting an obstacle.

A time to a time at which the controller 25 puts each first obstacle detector 31A in the non-detection state during the automatic travel after the start of the automatic travel from the time of the start of the automatic travel (the aforementioned predetermined time) is preferably set to a time in which entire regions of the non-detection ranges R3 are covered by the detection ranges R1 of the respective first obstacle detectors 31A (become detected regions) due to the movement of the tractor 1 after the start of the automatic travel.

For example, the time to the time at which the controller 25 puts each first obstacle detector 31A in the non-detection state during the automatic travel after the start of the automatic travel (the aforementioned predetermined time) can be set to a time in which the first obstacle detectors 31A pass the positions of the wheels (the front wheels 3F or the rear wheels 3R; hereunder the same) or lateral positions of the wheels (right lateral positions or left lateral positions of the wheels; hereunder the same) before the start of the automatic travel. Control by the controller 25 when the time has been set in this way is described below.

In this case, after the start of the automatic travel, the controller 25 puts each first obstacle detector 31A in the detection state of detecting an obstacle until the first obstacle detectors 31A pass the positions of the wheels or the lateral positions of the wheels before the start of the automatic travel, and the controller 25 puts each first obstacle detector 31A in the non-detection state of not detecting an obstacle after the first obstacle detectors 31A have passed the positions of the wheels or the lateral positions of the wheels before the start of the automatic travel.

When the tractor 1 travels automatically toward the front (that is, moves forward), after the start of the automatic travel, the controller 25 puts each first obstacle detector 31A in the detection state of detecting an obstacle until the first obstacle detectors 31A pass the positions of the front wheels 3F or the lateral positions of the front wheels 3F before the start of the automatic travel, and the controller 25 puts each first obstacle detector 31A in the non-detection state of not detecting an obstacle after the first obstacle detectors 31A have passed the positions of the front wheels 3F or the lateral positions of the front wheels 3F before the start of the automatic travel. In this case, "until the first obstacle detectors 31A pass the positions of the front wheels 3F or the lateral positions of the front wheels 3F before the start of the automatic travel" can be restated as "until, in the front-back direction, the first obstacle detectors 31A move forward beyond the positions of front ends of the front wheels 3F before the start of the automatic travel".

When the tractor 1 travels automatically toward the back (that is, moves backward), after the start of the automatic travel, the controller 25 puts each first obstacle detector 31A in the detection state of detecting an obstacle until the first obstacle detectors 31A pass the positions of the rear wheels 3R or the lateral positions of the rear wheels 3R before the start of the automatic travel, and the controller 25 puts each first obstacle detector 31A in the non-detection state of not detecting an obstacle after the first obstacle detectors 31A have passed the positions of the rear wheels 3R or the lateral positions of the rear wheels 3R before the start of the automatic travel. In this case, "until the first obstacle detectors 31A pass the positions of the rear wheels 3R or the lateral positions of the rear wheels 3R before the start of the automatic travel" can be restated as "until, in the front-back direction, the first obstacle detectors 31A move backward beyond the positions of rear ends of the rear wheels 3R before the start of the automatic travel". When this control is to be performed, the tractor 1 includes second obstacle detectors 31B provided rearward of the rear wheels 3R.

Figure 6A:
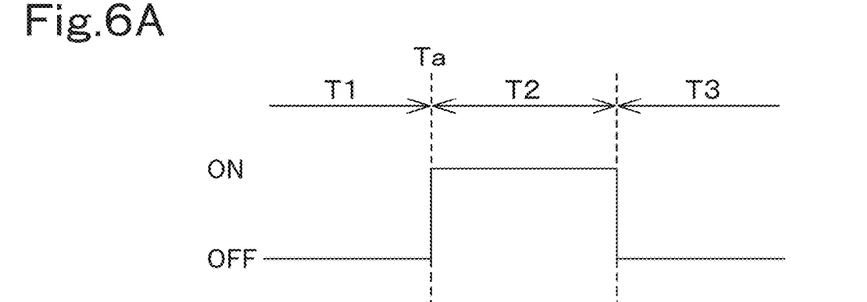
FIGS. 6A to 6C are explanatory diagrams of a control method using a controller.
Figure 6B:
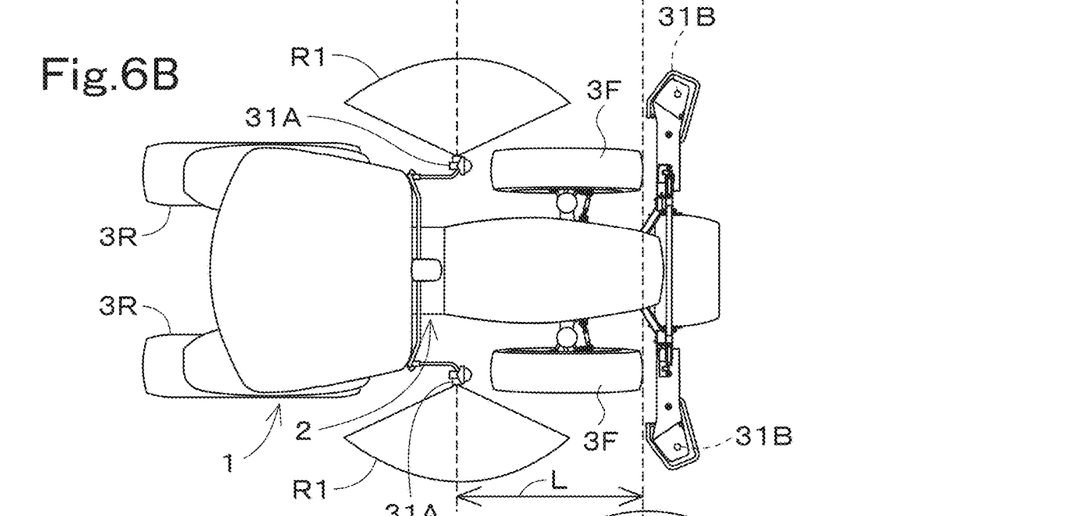
Figure 6C:
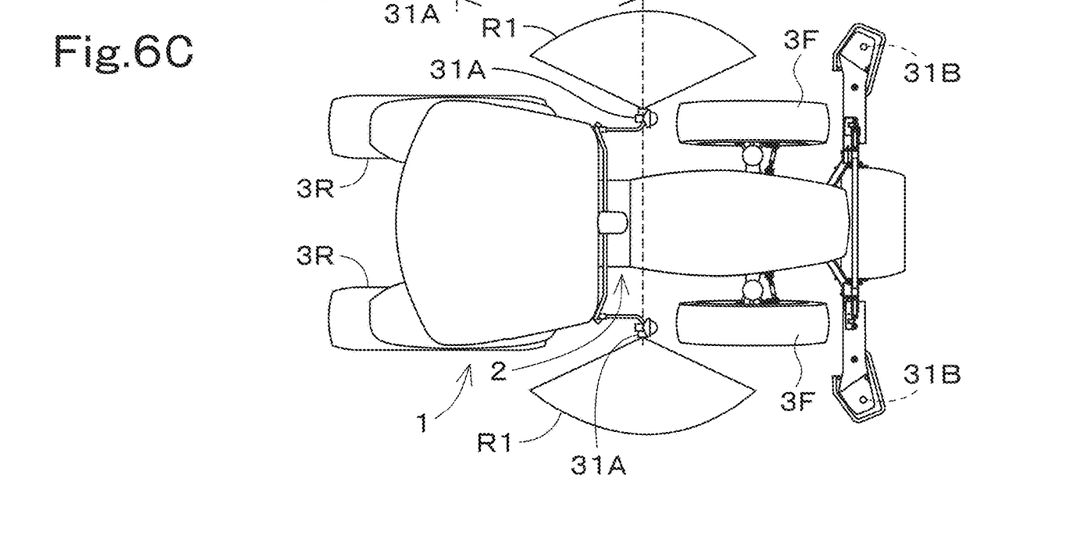

With reference to FIGS. 6A to 6C, the control by the controller 25 is described in detail below. Here, the case in which the tractor 1 moves forward due to automatic travel is described. Although the case in which the tractor 1 moves backward due to automatic travel is not illustrated, "moves forward" may be read as "moves backward", and "front wheels" may be read as "rear wheels" in the description below.

FIG. 6A illustrates a switching operation between ON and OFF of each first obstacle detector 31A by the controller 25. "ON" means that each first obstacle detector 31A is in the detection state, and "OFF" means that each first obstacle detector 31A is in the non-detection state. FIG. 6B illustrates the position of the tractor 1 at the start of the automatic travel. FIG. 6C illustrates the position of the tractor 1 after the start of the automatic travel and when, in the front-back direction, the first obstacle detectors 31A have reached the positions of the front ends of the front wheels 3F before the start of the automatic travel. At this time, the tractor 1 moves forward by a distance L from the position of the tractor 1 before the start of the automatic travel. The distance L is a distance in the front-back direction between the front ends of the front wheels 3F of the tractor 1 and the respective first obstacle detectors 31A.

First, before the tractor 1 starts the automatic travel (period T1), the controller 25 puts each first obstacle detector 31A in the non-detection state (OFF). When the tractor 1 starts the automatic travel (time Ta), that is, when the tractor 1 starts to move forward due to the automatic travel from the position shown in FIG. 6B, the controller 25 puts each first obstacle detector 31A in the detection state (ON). After the tractor 1 has started the automatic travel, until the first obstacle detectors 31A pass the positions of the front wheels 3F (or the lateral positions of the front wheels 3F) before the start of the automatic travel (period T2), that is, until the tractor 1 reaches the position illustrated in FIG. 6C, the controller 25 maintains the detection state (ON) of each first obstacle detector 31A. Then, after the tractor 1 has passed the positions of the front wheels 3F (or the lateral positions of the front wheels 3F) (period T3), that is, after the tractor 1 has passed the position illustrated in FIG. 6C, the controller 25 puts each first obstacle detector 31A in the non-detection state (OFF).

Figure 7A:
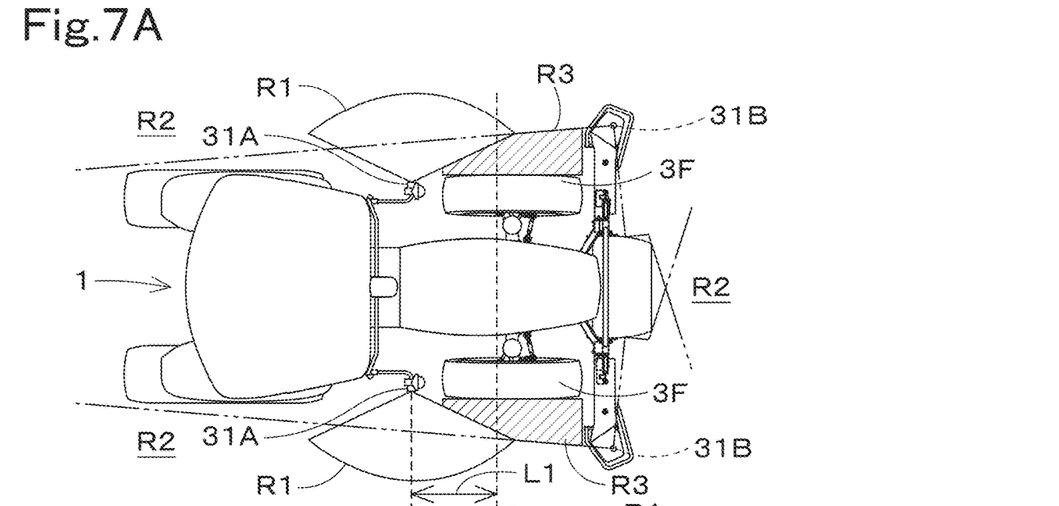
FIGS. 7A to 7C are different explanatory diagrams of the control method using the controller.
Figure 7B:
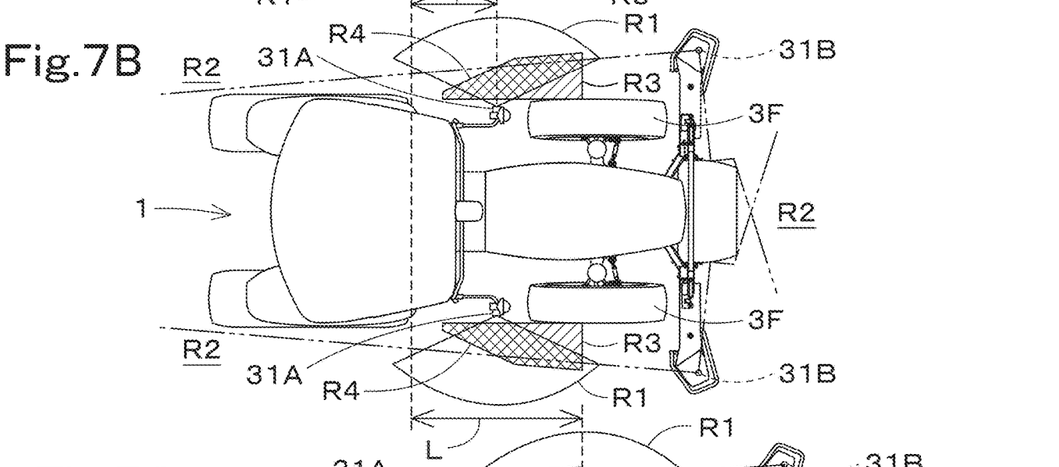
Figure 7C:
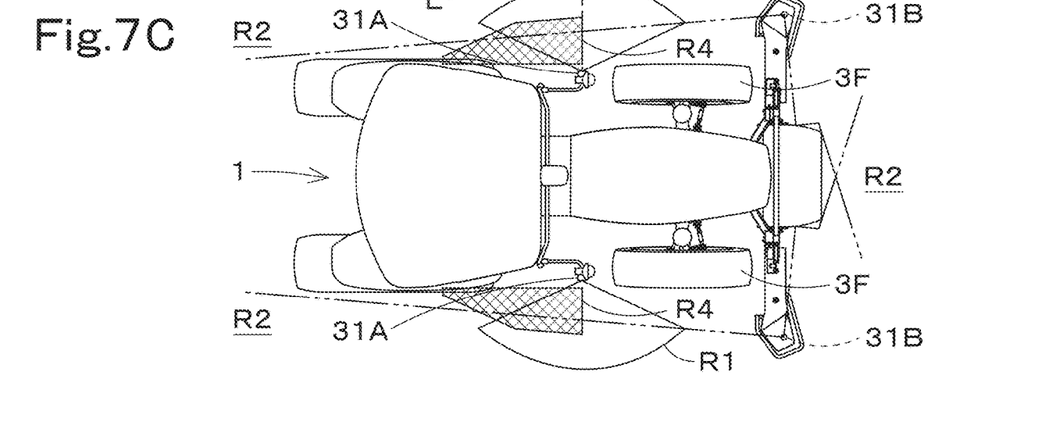

FIGS. 7A to 7C illustrate the relationships between the detection ranges R1 of the first obstacle detectors 31A and the non-detection ranges R3 before the start of the automatic travel of the tractor 1 when the controller 25 has performed the above-described control and the tractor 1 has automatically travelled. FIG. 7A illustrates a state at the start of the automatic travel of the tractor 1, FIG. 7B illustrates a state in which the tractor 1 has moved forward by a distance L1 (L1<L) after the start of the automatic travel of the tractor 1, and FIG. 7C illustrates a state in which the tractor 1 has moved forward by the distance L after the start of the automatic travel of the tractor 1. FIGS. 7A to 7C, of the non-detection ranges R3 before the start of the automatic travel of the tractor 1, each region (detected region R4) that has been detected by overlapping the detection range R1 of the corresponding first obstacle detector 31A is crosshatched.

As illustrated in FIGS. 7A to 7C, due to the controller 25 performing the above-described control, each first obstacle detector 31A that has been put in the detection state when the tractor 1 has started to move forward due to the automatic travel (see FIG. 7A) moves forward while being kept in the detection state (while having the corresponding detection range R1). Therefore, the detection ranges R1 of the first obstacle detectors 31A move forward while overlapping the respective non-detection ranges R3 and increasing the sizes of the respective detected regions R4 (see FIG. 7B), and the entire regions of the non-detection ranges R3 become the detected regions R4 (see FIG. 7C). As a result, obstacles can be detected in the entire regions of the non-detection ranges R3 by the first obstacle detectors 31A.

As described above, due to the controller 25 performing the above-described control, even if obstacles exist in the non-detection ranges R3 not included in the detection ranges R1 of the first obstacle detectors 31A and in the detection ranges R2 of the second obstacle detectors 31B when the tractor 1 is stopped (before the start of automatic travel), the obstacles are capable of being detected by the first obstacle detectors 31A. As a result, when the tractor 1 (the vehicle body 2) starts to move due to the automatic travel, it is possible to prevent the vehicle body 2 or the like of the tractor 1 from coming into contact with the obstacles (human beings or things) existing in the non-detection ranges R3.

Due to the controller 25 putting the first obstacle detectors 31A in the non-detection state after the first obstacle detectors 31A have passed the positions of the front wheels 3F or the lateral positions of the front wheels 3F before the automatic travel, the controller 25 is capable of preventing stoppage of the automatic travel caused by, for example, the first obstacle detectors 31A falsely detecting obstacles. Specifically, for example, it is possible to prevent stoppage of the automatic travel caused by the first obstacle detectors 31A falsely detecting as obstacles, for example, crops existing beside the vehicle body 2.

For example, by the following method, the controller 25 is capable of determining that the first obstacle detectors 31A have passed the positions of the wheels or the lateral positions of the wheels before the start of automatic travel. However, the method of determining that the first obstacle detectors 31A have passed the positions of the wheels or the lateral positions of the wheels before the start of the automatic travel is not limited to the method described below.

Based on at least an elapsed time from the start of the automatic travel, the controller 25 is capable of determining that the first obstacle detectors have passed the positions of the wheels or the lateral positions of the wheels before the start of the automatic travel. Specifically, based on the elapsed time from the start of the automatic travel and the travel speed of the vehicle body 2, the controller 25 is capable of determining that the first obstacle detectors 31A have passed the positions of the wheels or the lateral positions of the wheels before the start of the automatic travel. In this case, based on the distance L of the tractor 1, which is a known value, the travel speed of the tractor 1 detected by a vehicle speed sensor (the average travel speed while the tractor 1 moves forward by the distance L), and the elapsed time from the start of the automatic travel measured by a time measuring device, the controller 25 determines that the first obstacle detectors 31A have passed the positions of the wheels or the lateral positions of the wheels before the start of the automatic travel. For example, when the travel speed is V (m/s), the elapsed time is T(s), and the distance in the front-back direction between the first obstacle detectors 31A and the front ends of the respective front wheels 3F is L(m), and when the elapsed time T satisfies T>L/V, the controller 25 determines that the first obstacle detectors 31A have passed the positions of the wheels or the lateral positions of the wheels before the start of the automatic travel.

Based on the elapsed time from the start of the automatic travel and the acceleration of the vehicle body 2, the controller 25 is also capable of determining that the first obstacle detectors 31A have passed the positions of the wheels or the lateral positions of the wheels before the start of the automatic travel. In this case, based on the distance L of the tractor 1, which is a known value, the acceleration of the tractor 1 detected by an acceleration sensor (the average acceleration while the tractor 1 moves forward by the distance L), and the elapsed time from the start of the automatic travel measured by a time measuring device, the controller 25 is capable of determining that the first obstacle detectors 31A have passed the positions of the wheels or the lateral positions of the wheels before the start of the automatic travel.

Based on the position of the vehicle body 2 detected by the position detector 20, the controller 25 is also capable of determining that the first obstacle detectors 31A have passed the positions of the wheels or the lateral positions of the wheels before the start of the automatic travel. In this case, based on the distance L of the tractor 1, which is a known value, a position P1 of the vehicle body 2 before the start of the automatic travel detected by the position detector 20, and a position P2 of the vehicle body 2 after the start of the automatic travel detected by the position detector 20, the controller 25 is capable of determining that the first obstacle detectors 31A have passed the positions of the wheels or the lateral positions of the wheels before the start of the automatic travel by comparing the distances at the position P1 and at the position P2 in the front-back direction with the distance L.

The work vehicle 1 of the above-described preferred embodiment provides the following effects.

The work vehicle 1 includes a vehicle body 2 including at least one wheel, a controller 25 to cause the vehicle body 2 to perform automatic travel along a travel route set in advance, a driver seat 6 mounted on the vehicle body 2, a driver seat protective body 7 provided around the driver seat 6, at least one first obstacle detector 31A provided at a side portion of the driver seat protective body 7, and capable of detecting an obstacle, and at least one second obstacle detector 31B provided at a position differing from a position of the at least one first obstacle detector 31A in a front-back direction, and capable of detecting an obstacle. At a time of start of the automatic travel, the controller 25 is configured or programmed to put each first obstacle detector 31A in a detection state of detecting an obstacle, and, during automatic travel after the start of the automatic travel, the controller 25 is configured or programmed to put each first obstacle detector 31A in a non-detection state of not detecting an obstacle.

According to this structure, since, at the time of the start of the automatic travel, the at least one first obstacle detector 31A is put in the detection state of detecting an obstacle, it is possible to prevent contact with an obstacle when the work vehicle 1 starts to move due to the automatic travel. Since, during the automatic travel after the start of the automatic travel, the at least one first obstacle detector 31A is put in the non-detection state of not detecting an obstacle, it is possible to prevent a false detection of an obstacle and realize smooth automatic travel.

After the start of the automatic travel, the controller 25 is configured or programmed to put each first obstacle detector 31A in the detection state of detecting an obstacle until the first obstacle detector 31A passes a position of the at least one wheel or a lateral position of the at least one wheel before the start of the automatic travel, and the controller is configured or programmed to put the at least one first obstacle detector 31A in the non-detection state of not detecting an obstacle after the at least one first obstacle detector 31A has passed the position of the at least one wheel or the lateral position of the at least one wheel before the start of the automatic travel.

According to this structure, since, after the start of the automatic travel, the at least one first obstacle detector 31A is put in the detection state until the at least one first obstacle detector 31A pass the position of the at least one wheel or the lateral position of the at least one wheel before the start of the automatic travel, an obstacle existing at, for example, a lateral region of the front wheel, which is a non-detection range of the obstacle detector before the start of the automatic travel, is capable of being detected by the first obstacle detector 31A after the start of the automatic travel. Therefore, it is possible to reliably prevent contact with an obstacle when the work vehicle 1 starts to move due to the automatic travel.

The at least one wheel includes at the least one front wheel 3F provided at a front portion of the vehicle body 2 and a rear wheel 3R provided at a rear portion of the vehicle body 2, the at least one second obstacle detector 31B is provided forward of the at least one first obstacle detector 31A, and, after the start of the automatic travel, the controller 25 is configured or programmed to put the at least one first obstacle detector 31A in the detection state of detecting an obstacle until the at least one first obstacle detector 31A passes a position of the at least one front wheel 3F or a lateral position of the at least one front wheel 3F before the start of the automatic travel, and the controller 25 is configured or programmed to put the at least one first obstacle detector 31A in the non-detection state of not detecting an obstacle after the at least one first obstacle detector 31A has passed the position of the at least one front wheel 3F or the lateral position of the at least one front wheel 3F before the start of the automatic travel.

According to this structure, when the work vehicle 1 moves forward due to the automatic travel, it is possible to prevent contact with an obstacle when the work vehicle 1 starts to move due to the automatic travel, and prevent a false detection of an obstacle and realize smooth automatic travel.

Based on at least an elapsed time from the start of the automatic travel, the controller 25 is configured or programmed to determine that the at least one first obstacle detector 31A has passed the position of the at least one wheel or the lateral position of the at least one wheel before the start of the automatic travel.

According to this structure, it is possible to, based on, for example, the elapsed time from the start of the automatic travel, easily determine that the at least one first obstacle detector 31A has passed the position of the at least one wheel or the lateral position of the at least one wheel before the start of the automatic travel.

Based on an elapsed time from the start of the automatic travel and a travel speed of the vehicle body 2, the controller 25 is configured or programmed to determine that the at least one first obstacle detector 31A has passed the position of the at least one wheel or the lateral position of the at least one wheel before the start of the automatic travel.

According to this structure, it is possible to, based on the elapsed time from the start of the automatic travel and the travel speed of the vehicle body 2, easily and reliably determine that the at least one first obstacle detector 31A has passed the position of the at least one wheel or the lateral position of the at least one wheel before the start of the automatic travel.

Based on an elapsed time from the start of the automatic travel and an acceleration of the vehicle body 2, the controller 25 is configured or programmed to determine that the at least one first obstacle detector 31A has passed the position of the at least one wheel or the lateral position of the at least one wheel before the start of the automatic travel.

According to this structure, it is possible to, based on the elapsed time from the start of the automatic travel and the acceleration of the vehicle body 2, easily and reliably determine that the at least one first obstacle detector 31A has passed the position of the at least one wheel or the lateral position of the at least one wheel before the start of the automatic travel.

The work vehicle 1 includes a position detector 20 that detects a position of the vehicle body 2, and, based on the position of the vehicle body 2 detected by the position detector 20, the controller 25 is configured or programmed to determine that the at least one first obstacle detector 31A has passed the position of the at least one wheel or the lateral position of the at least one wheel before the start of the automatic travel.

According to this structure, it is possible to, based on the position of the vehicle body 2 detected by the position detector 20, easily and reliably determine that the at least one first obstacle detector 31A has passed the position of the at least one wheel or the lateral position of the at least one wheel before the start of the automatic travel.

The at least one second obstacle detector 31B is disposed forward of the at least one front wheel 3F, and the at least one first obstacle detector 31A is disposed between the at least one front wheel 3F and the at least one rear wheel 3R so as to be capable of detecting an obstacle outward of the at least one front wheel 3F in a vehicle-width direction.

According to this structure, it is possible to prevent contact with an obstacle when the work vehicle 1 starts to move due to the automatic travel, while reliably detecting an obstacle existing in front of the at least one front wheel 3F by the at least one second obstacle detector 31B and reliably detecting an obstacle existing between the at least one front wheel 3F and the at least one rear wheel 3R and outward of the at least one front wheel 3F in the vehicle-width direction by the at least one first obstacle detector 31A.

The at least one second obstacle detector 31B is disposed outward of the at least one front wheel 3F in a vehicle-width direction, and the at least one first obstacle detector 31A is disposed inward of the at least one second obstacle detector 31B in the vehicle-width direction.

According to this structure, it is possible to prevent contact with an obstacle when the work vehicle 1 starts to move due to the automatic travel, while reliably detecting obstacles existing outward of the at least one front wheel 3F in the vehicle-width direction by the at least one second obstacle detector 31B and reliably detecting an obstacle existing inward of the at least one second obstacle detector 31B in the vehicle-width direction by the at least one first obstacle detector 31A.

The driver seat protective body 7 includes a cabin 7 mounted on the vehicle body 2, and the at least one first obstacle detector 31A is capable of detecting an obstacle between a doorway 8 of the cabin 7 and the at least one front wheel 3F.

According to this structure, since an obstacle existing between the doorway 8 of the cabin 7 and the at least one front wheel 3F is capable of being detected by the at least one first obstacle detector 31A, after the work vehicle 1 has started the automatic travel, it is possible to prevent contact with the obstacles existing between the doorway 8 and the at least one front wheel 3F before the start of the automatic travel.

The at least one first obstacle detector 31A includes a sonar that detects an obstacle by irradiation with a sound wave as a detection wave, and the at least one second obstacle detector 31B includes a laser scanner that detects an obstacle by irradiation with a laser as a detection wave.

According to this structure, it is possible to reliably detect an obstacle existing beside the driver seat protective body 7 by the at least one first obstacle detector 31A, and it is possible to detect an obstacle existing in a wide range around (for example, in front of) the work vehicle 1 by the at least one second obstacle detector 31B.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
   a vehicle body including a wheel;
   a controller to cause the vehicle body to perform automatic travel along a travel route set in advance;
   a driver seat mounted on the vehicle body;
   a driver seat protective body provided around the driver seat;
   a first obstacle detector provided at a side portion of the driver seat protective body, and capable of detecting an obstacle; and
   a second obstacle detector provided at a position within the work vehicle which is different from a position of the first obstacle detector within the work vehicle in a front-back direction, and capable of detecting the obstacle; wherein
   at a time of start of the automatic travel, the controller is configured or programmed to put the first obstacle detector included in the work vehicle in a detection state of detecting the obstacle, and, during automatic travel after the start of the automatic travel, the controller is configured or programmed to put the first obstacle detector included in the work vehicle in a non-detection state of not detecting the obstacle.

2. The work vehicle according to claim 1, wherein, after the start of the automatic travel, the controller is configured or programmed to put the first obstacle detector, which is located rearward of the wheel, in the detection state of detecting the obstacle until the first obstacle detector passes a position of the wheel or a lateral position of the wheel before the start of the automatic travel in a forward direction, and the controller is configured or programmed to put the first obstacle detector in the non-detection state of not detecting the obstacle after the first obstacle detector has passed the position of the wheel or the lateral position of the wheel before the start of the automatic travel in the forward direction.

3. The work vehicle according to claim 2, wherein the wheel includes a front wheel provided at a front portion of the vehicle body and a rear wheel provided at a rear portion of the vehicle body;
   the second obstacle detector is provided forward of the first obstacle detector; and
   after the start of the automatic travel, the controller is configured or programmed to put the first obstacle detector in the detection state until the first obstacle detector passes a position of the front wheel or a lateral position of the front wheel before the start of the automatic travel, and the controller is configured or programmed to put the first obstacle detector in the non-detection state after the first obstacle detector has passed the position of the front wheel or the lateral position of the front wheel before the start of the automatic travel.

4. The work vehicle according to claim 3, wherein
   the second obstacle detector is forward of the front wheel; and
   the first obstacle detector is between the front wheel and the rear wheel such that the first obstacle detector is located rearward of the front wheel and forward of the rear wheel so as to be capable of detecting an obstacle outward of the front wheel in a vehicle-width direction.

5. The work vehicle according to claim 3, wherein
   the front wheel includes a left front wheel and a right front wheel;
   the second obstacle detector includes a left second obstacle detector located leftward of the left front wheel and a right second obstacle detector located rightward of the right front wheel; and
   the first obstacle detector is inward of each of the left and right second obstacle detectors in a vehicle-width direction.

6. The work vehicle according to claim 3, wherein
   the vehicle body includes a vehicle-body frame;
   a hood is provided above the vehicle-body frame; and
   the first obstacle detector includes a left first obstacle detector located leftward of the hood and a right first obstacle detector located rightward of the hood, the left and right first obstacle detectors being located between the front wheel and the rear wheel such that the left and right first obstacle detectors are located rearward of the front wheel and forward of the rear wheel.

7. The work vehicle according to claim 6, wherein
   a weight is provided on a front side of the vehicle-body frame; and
   the second obstacle detector includes a left second obstacle detector located leftward of the weight and a right second obstacle detector located rightward of the weight.

8. The work vehicle according to claim 3, wherein the front wheel includes a left front wheel and a right front wheel; and
   the second obstacle detector is on each of a front left side of the left front wheel and a front right side of the right front wheel.

9. The work vehicle according to claim 2, wherein, based on at least an elapsed time from the start of the automatic travel, the controller is configured or programmed to determine that the first obstacle detector has passed the position of the wheel or the lateral position of the wheel before the start of the automatic travel.

10. The work vehicle according to claim 2, wherein, based on an elapsed time from the start of the automatic travel and a travel speed of the vehicle body, the controller is configured or programmed to determine that the first obstacle detector has passed the position of the wheel or the lateral position of the wheel before the start of the automatic travel.

11. The work vehicle according to claim 2, wherein, based on an elapsed time from the start of the automatic travel and an acceleration of the vehicle body, the controller is configured or programmed to determine that the first obstacle detector has passed the position of the wheel or the lateral position of the wheel before the start of the automatic travel.

12. The work vehicle according to claim 2, further comprising:
a position detector to detect a position of the vehicle body; wherein
based on the position of the vehicle body detected by the position detector, the controller is configured or programmed to determine that the first obstacle detector has passed the position of the wheel or the lateral position of the wheel before the start of the automatic travel.

13. The work vehicle according to claim 1, wherein
the driver seat protective body includes a cabin mounted on the vehicle body; and
the first obstacle detector is capable of detecting an obstacle between a doorway in a side surface of the cabin and a front wheel provided at a front portion of the vehicle body.

14. The work vehicle according to claim 13, wherein
the vehicle body includes a vehicle-body frame;
a hood is provided above the vehicle-body frame; and
the first obstacle detector is lower than an upper end portion of the hood and higher than a lower end portion of the cabin and the front wheel.

15. The work vehicle according to claim 1, wherein the first obstacle detector includes a sonar to detect an obstacle by irradiation with a sound wave as a detection wave; and
the second obstacle detector includes a laser scanner to detect an obstacle by irradiation with a laser as a detection wave.

16. The work vehicle according to claim 1, wherein a time from the time of the start of the automatic travel to a time at which the first obstacle detector is put in the non-detection state during the automatic travel after the start of the automatic travel is set to a time in which an entire region of a non-detection range not included in a detection range of the first obstacle detector and not included in a detection range of the second obstacle detector before the start of the automatic travel is covered by the detection range of the first obstacle detector due to a movement after the start of the automatic travel.

17. The work vehicle according to claim 1, wherein
the first obstacle detector is switchable between ON and OFF, the ON being the detection state of detecting the obstacle, the OFF being the non-detection state of not detecting the obstacle; and
at the time of start of the automatic travel, the controller is configured or programmed to turn ON the first obstacle detector to put the first obstacle detector in the detection state, and, during automatic travel after the start of the automatic travel, the controller is configured or programmed to turn OFF the first obstacle detector to put the first obstacle detector in the non-detection state.

18. The work vehicle according to claim 1, wherein a position of the second obstacle detector is changeable to a detection position to detect an obstacle and to a retraction position at which the second obstacle detector retracts from the detection position toward the vehicle body.

19. The work vehicle according to claim 1, wherein
the second obstacle detector is covered by a cover;
the cover includes an upper cover located above the second obstacle detector and a lower cover located below the second obstacle detector;
a gap is defined between the upper cover and the lower cover; and
the second obstacle detector is operable to transmit and receive a detection wave to detect an obstacle via the gap.

* * * * *